United States Patent
Moon et al.

(10) Patent No.: US 9,811,918 B2
(45) Date of Patent: Nov. 7, 2017

(54) METHOD AND APPARATUS FOR ESTIMATING IMAGE OPTICAL FLOW

(71) Applicants: SAMSUNG ELECTRONICS CO., LTD., Suwon-si (KR); GWANGJU INSTITUTE OF SCIENCE AND TECHNOLOGY, Gwangju (KR)

(72) Inventors: Young-su Moon, Seoul (KR); Kuk-jin Yoon, Gwangju (KR); Jae-Hyun Kim, Seoul (KR)

(73) Assignees: SAMSUNG ELECTRONICS CO., LTD., Suwon-si (KR); GWANJU INSTITUTE OF SCIENCE AND TECHNOLOGY, Gwangju (KR)

(*) Notice: Subject to any disclaimer, the term of this patent is extended or adjusted under 35 U.S.C. 154(b) by 61 days.

(21) Appl. No.: 15/017,792

(22) Filed: Feb. 8, 2016

(65) Prior Publication Data

US 2016/0307321 A1 Oct. 20, 2016

(30) Foreign Application Priority Data

Apr. 17, 2015 (KR) .................. 10-2015-0054627

(51) Int. Cl.
- G06K 9/46 (2006.01)
- G06T 7/207 (2017.01)
- G06T 7/269 (2017.01)

(52) U.S. Cl.
CPC ............ *G06T 7/207* (2017.01); *G06T 7/269* (2017.01); *G06T 2207/10016* (2013.01); *G06T 2207/20016* (2013.01)

(58) Field of Classification Search
CPC ............ G06T 7/207; G06T 7/269; G06T 2207/10016; G06T 2207/20016; H04N 5/145
USPC ........................ 382/201, 218, 236
See application file for complete search history.

(56) References Cited

U.S. PATENT DOCUMENTS

| 7,324,687 B2 | 1/2008 | Zitnick, III et al. | |
| 2015/0365696 A1* | 12/2015 | Garud | H04N 19/53 375/240.08 |

OTHER PUBLICATIONS

Kim, et al. "Robust motion estimation under varying illumination",Image and Vision Computing, pp. 365-375, 2004.*
B. D. Lucas et al, "An Iterative Image Registration Technique With an Application to Stereo Vision"; Proceedings DARPA Image Understanding Workshop, Apr. 1981; pp. 121-130.
(Continued)

*Primary Examiner* — Daniel Mariam
(74) *Attorney, Agent, or Firm* — Sughrue Mion, PLLC (57) ABSTRACT

An apparatus and method of estimating an image optical flow are provided. The method includes receiving temporally-consecutive first and second images; calculating rates of change of brightness values of pixels in the received temporally-consecutive first and second images; calculating a first optical flow estimation result value of a first pixel within the first image and a second optical flow estimation result value of a second pixel within the second image by using the calculated rates of change; comparing the first optical flow estimation result value with the second optical flow estimation result value; and correcting the first optical flow estimation result value and the second optical flow estimation result value by using a result of the comparison.

21 Claims, 5 Drawing Sheets

(56) References Cited

OTHER PUBLICATIONS

J-Y. Bouguet, "Pyramidal Implementation of the Lucas Kanade Feature Tracker Description of the algorithm"; OpenCV Documentation, 1999; 10 pgs.
T. Brox et al, "Large Displacement Optical Flow: Descriptor Matching in Variational Motion Estimation"; IEEE Transaction on Pattern Analysis and Machine Intelligence, 2010, 14 pgs.
P. Weinzaepfel et al, "Deepflow: Large Displacement Optical Flow With Deep Matching"; IEEE International Conference on Computer Vision, 2013, 8 pgs.
B. Horn et al, "Determining Optical Flow"; Artificial Intelligence, vol. 16, 1981, pp. 185-203.
M.Black et al, "The Robust Estimation of Multiple Motions: Parameteric and Piecewise-Smooth Flow Fields"; Computer Vision and Image Understanding, vol. 63, No. 1, Jan. 1996, pp. 75-104.
J. Xiao et al, "Bilateral Filtering-based Optical Flow Estimation with Occlusion Detection"; European Conference on Computer Vision, 2006, 14 pgs.
C. Barnes et al, "PatchMatch: a Randomized Correspondence Algorithm for Structural Image Editing", ACM Transactions on Graphics, 2009, 10 pgs.
F. Besse et al, "PMBP: PatchMatch Belief Propagation for Correspondence Field Estimation"; Int J Comput Vis, 2014, 12 pgs.

\* cited by examiner

$$S(x,y) = \begin{cases} \frac{n}{\varepsilon}d & (d < \varepsilon) \\ n & (d \geq \varepsilon) \end{cases}$$

FIG. 3

$$W(i) = \alpha \sqrt{\frac{i}{\beta}}$$

FIG. 4

$$E_c(x,y) = \begin{cases} d^2 & (d^2 < \tau) \\ \tau & (d^2 \geq \tau) \end{cases}$$

METHOD AND APPARATUS FOR ESTIMATING IMAGE OPTICAL FLOW

CROSS-REFERENCE TO RELATED PATENT APPLICATION

This application claims priority from Korean Patent Application No. 10-2015-0054627 filed on Apr. 17, 2015, in the Korean Intellectual Property Office, the disclosure of which is incorporated by reference herein in its entirety.

BACKGROUND

1. Field

Method and apparatus consistent with exemplary embodiments relate to a method and apparatus for estimating image optical flow.

2. Description of the Related Art

An optical flow is a two-dimensional (2D) motion component of a pixel between two temporally consecutive image frames. Thus, a conventional optical flow estimation technique often includes receiving two temporally consecutive images, determining corresponding pixels and their respective positions in the images, and estimating a difference between the positions of the corresponding pixels. Here, the estimated difference is the aforementioned optical flow, which corresponds to movement of the pixel. The optical flow may be generated due to a movement of a camera for capturing an image, or a movement of a scene, or a subject being captured, or may be generated due to a change in an illumination environment even when there is no movement of a camera or a scene or a subject being captured. An optical flow is an amount of motion generated due to a change in a brightness pattern within an image. In a particular condition, the optical flow is closely related to actual three-dimensional (3D) motion in a 3D scene. Due to these features, the optical flow is being widely used in various fields, such as 3D restoration via an image or moving object tracking in computer vision, image noise suppression, high resolution image production, and moving picture frame rate conversion.

SUMMARY

Exemplary embodiments of the present disclosure provide methods and apparatuses for estimating image optical flow.

Aspects will be set forth in part in the description which follows and, in part, will be apparent from the description, or may be learned by practice of the presented embodiments.

According to an aspect of an exemplary embodiment, this is provided a method of estimating image optical flow including receiving temporally-consecutive first and second images; calculating rates of change of brightness values of pixels in the received temporally-consecutive first and second images; calculating a first optical flow estimation result value of a first pixel within the first image and a second optical flow estimation result value of a second pixel within the second image by using the calculated change rates; comparing the first optical flow estimation result value with the second optical flow estimation result value; and correcting the first and the second optical flow estimation result values by using a result of the comparison.

The method may further include downscaling pixels included in each of the received temporally-consecutive first and second images. The calculating of the rates of change may include calculating rates of change of brightness values of the downscaled first and the downscaled second images.

The method may further include outputting a corrected first optical flow estimation result value and a second corrected optical flow estimation result value.

The method may further include storing the calculated rates of change and a graph structure.

The method may further include determining the first optical flow estimation result value to be a first optical flow estimation result value of a neighboring pixel of the first pixel and determining the second optical flow estimation result value to be a second optical flow estimation result value of a neighboring pixel of the second pixel.

The method may further include calculating an energy by using a belief propagation algorithm.

The comparing may include determining a consistency-based reliability of the first and the second optical flow estimation result values by using the result of the comparison.

The calculating of the energy may include calculating the energy by using the consistency-based reliability.

The calculating of the energy may include calculating the energy by using an iteration number-based reliability.

According to an aspect of an exemplary embodiment, this is provided an apparatus for estimating image optical flow including a pre-processor configured to receive temporally-consecutive first and second images and calculate change rates of brightness values of the received first and second images; an optimizer configured to calculate a first optical flow estimation result value of a first pixel within the first image and a second optical flow estimation result value of a second pixel within the second image by using the calculated change rates, and compare the first optical flow estimation result value with the second optical flow estimation result value; and an output interface configured to correct the first and the second optical flow estimation result values by using a result of the comparison.

The pre-processor may downscale pixels of each of the received first and second images and calculate rates of change of brightness values of the downscaled first and the downscaled second images.

The output interface may output a first corrected optical flow estimation result value of the first image and a second corrected optical flow estimation result value of the second image.

The pre-processor may store the calculated rates of change and a graph structure.

The optimizer may determine the first optical flow estimation result value to be a first optical flow estimation result value of a neighboring pixel of the first pixel and determine the second optical flow estimation result value to be a second optical flow estimation result value of a neighboring pixel of the second pixel.

The optimizer may calculate energy by using a belief propagation algorithm.

The optimizer may determine a consistency-based reliability of the first and the second optical flow estimation result values by using the result of the comparison.

The optimizer may calculate the energy by using the consistency-based reliability.

The optimizer may calculate the energy by using an iteration number-based reliability.

According to an aspect of an exemplary embodiment, this is provided a non-transitory computer-readable recording medium recorded thereon a computer program, which, when executed by a computer, performs the above-described method.

BRIEF DESCRIPTION OF THE DRAWINGS

The above and other aspects will become apparent and more readily appreciated from the following description of the exemplary embodiments, taken in conjunction with the accompanying drawings in which.

DETAILED DESCRIPTION OF EXEMPLARY EMBODIMENTS

The attached drawings for illustrating exemplary embodiments are referred to in order to gain a sufficient understanding of the present disclosure, the merits thereof, and the objectives accomplished by the implementation of the present disclosure. The disclosure may, however, be embodied in many different forms and should not be construed as being limited to the exemplary embodiments set forth herein; rather, these exemplary embodiments are provided so that this disclosure will be thorough and complete, and will fully convey the concept of the disclosure to those skilled in the art. The scope of the present disclosure is only defined in the claims. Throughout the specification, like reference numerals or characters refer to like elements.

Hereinafter, the terms used in the specification will be briefly described, and then the present disclosure will be described in detail.

Although general terms widely used at present were selected for describing the present disclosure in consideration of the functions thereof, these general terms may vary according to intentions of one of ordinary skill in the art, precedents, the advent of new technologies, and the like. Terms arbitrarily selected by the applicant of the present disclosure may also be used in a specific case. Their meanings need to be given in the detailed description of the present disclosure. Hence, the terms must be defined based on their meanings and the content of the entire specification, not by simply stating the terms.

The terms "comprises" and/or "comprising" or "includes" and/or "including" when used in this specification, specify the presence of stated elements, but do not preclude the presence or addition of one or more other elements. Also, the term "unit" in the present disclosure may represent a software component or a hardware component, such as a field-programmable gate array (FPGA) or an application-specific integrated circuit (ASIC), performing a specific function. However, the term "unit" is not limited to software or hardware. The term "unit" may be configured to be included in an addressable storage medium or to reproduce one or more processors. Thus, for example, the term "unit" may refer to components, such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units".

Exemplary embodiments of the present disclosure are described in detail herein with reference to the accompanying drawings so that this disclosure may be easily performed by one of ordinary skill in the art to which the present disclosure pertain. The disclosure may, however, be embodied in many different forms and should not be construed as being limited to the exemplary embodiments set forth herein. In the drawings, parts irrelevant to the description are omitted for simplicity of explanation.

Throughout the specification, an "image" may refer to multi-dimensional data formed of discrete image elements (e.g., pixels in a two-dimensional (2D) image and voxels in a three-dimensional (3D) image).

In an exemplary embodiment, an optical flow estimating method is to receive two temporally-consecutive images and search for corresponding points of pixels between the two images to thereby estimate motions of the pixels. The optical flow estimating method is related to a search for corresponding points between two images, such as stereo matching in which corresponding points of pixels are estimated from two images obtained at different time points.

However, in the stereo matching, because an image may be acquired via a predetermined camera configuration and it is assumed that two images are simultaneously acquired, an epipolar constraint condition may be used together with camera correction and image correction, and thus a search area for estimating the corresponding points may be reduced to a one dimensional (1D) estimation. Because a motion between two corresponding pixels is defined as only a horizontal motion in a horizontal axis, a difference between the corresponding pixels is not large.

However, in optical flow estimation, because a motion of a camera for capturing an image or a motion of a subject for photography has no constraints, a search area to be searched to estimate corresponding points is a 2D area. Additionally, because motion of a pixel has two unknown quantities along a horizontal axis and a vertical axis, the complexity of optical flow estimation and the quantity of calculations significantly increase.

To achieve effective optical flow estimation, two important assumptions are made. The first assumption is that corresponding points between two images have the same brightness, and the second assumption is that a motion of each pixel is small, which means an optical flow has a small magnitude. However, even when these assumptions are used, it is still difficult to estimate an optical flow having two unknown quantities for each pixel. Thus, a smoothness constraint that neighboring adjacent pixels have similar optical flows is further used.

As a method of estimating a motion within an image, a Lucas-Kanade method (B. D. Lucas and T. Kanade, An iterative image registration technique with an application to stereo vision, 1981.) is used. The Lucas-Kanade method estimates an optical flow by using change rate information of an image brightness value. The Lucas-Kanade method formulates the problem of optical estimation based on a Taylor series that uses image brightness values in a horizontal direction, a vertical direction, and a time axis. However, this method has several problems.

First, the Lucas-Kanade method may not estimate a large optical flow generated by a fast moving object because terms higher than the second order are ignored during development of a Taylor series under the assumption that an optical flow has a small magnitude. To address this problem, Bouguet (J-Y. Bouguet, Pyramidal Implementation of the Lucas-Kanade Feature Tracker, OpenCV Documentation, 1999.) has proposed a method using a level structure by generating an image pyramid. However, in this structure, it is difficult to estimate, in an upper level, a fine optical flow generated in a fine image structure, and it is impossible to restore the fine optical flow in a lower level. To address this problem, Brox and Malik (T. Brox and J. Malik, Large Displacement Optical flow: Descriptor Matching in Variational Motion Estimation, IEEE Transaction on Pattern analysis and machine intelligence, 2010.) assumes a histogram of oriented gradients (HoG) descriptor matching result to be a demonstration material and uses this demonstration material as a constraint for estimating an optical flow in a variational method-based optical flow estimation process. Similarly, Weinzaepfel et al. (P. Weinzaepfel, J. Revaud, Z. Harchaoui, C. Schmid, DeepFlow: Large displacement optical flow with deep matching, IEEE International Conference on Computer Vision, 2013.) proposed a method of more accurately estimating a motion of an object easily deformable by a fast motion by switching, to deep matching an existing descriptor constricted with only a rigid motion.

However, it is difficult to estimate an optical flow generated due to ambiguity that occurs in a smooth area. A wrongly estimated optical flow on a smooth area is generated because the ambiguity makes it difficult to distinguish one area over another area when searching for a corresponding area of a particular area. Because only a local individual search for this area is not enough for optical flow estimation, methods that use a smoothness constraint condition that nearby pixels have similar optical flows are generally used. A Horn-Schunck method (B. Horn and B. Schunck. Determining optical flow. Artificial Intelligence, 16:185-203, 1981.) is a pioneering research using these methods and is capable of using a smoothness constraint via a variational method. However, such a consecutive optimization method may effectively handle a problem only in the case of a Convex function. A method using a discrete optimization method has been proposed to effectively handle an energy function other than a Convex function. However, this energy-function-based method may rather generate an error in optical flow estimation with respect to a dense structure when using a too strict smoothness constraint for the case in which a wide area is smooth.

In addition, it is difficult to estimate an optical flow that is generated on a boundary and occlusion areas of a motion. This problem usually occurs when a smoothness constraint is used. To handle this problem, a method using a robust function has been proposed (M. Black and P. Anandan, The robust estimation of multiple motions: Parameteric and piecewise-smooth flow fields. Computer vision and image understanding, 1996.). Also, J. Xiao, H. Cheng, H. Sawhney, C. Rao, and M. Isnardi (Bilateral filtering-based optical flow estimation with occlusion detection, European conference on Computer Vision, 2006.) proposed a method of directly modeling occlusion areas and directly taking the modelled occlusion areas into account during optical flow estimation.

Optical flow estimation has several problems. First, an error may be generated in an environment under an assumption that corresponding pixels have the same brightness value. This assumption is a common assumption in optical flow estimation. In many cases, this assumption is not correct if the optical flow is caused by, for example, an illumination change or image noise. Second, it is difficult to estimate accurate optical flows from both a smooth area and an image area having a dense structure. When a strict smoothness constraint is used to estimate an accurate optical flow from a smooth area, an inaccurate optical flow result is obtained from an area having a dense structure. On the other hand, when a loose smoothness constraint is used to estimate an optical flow from the area having a dense structure, an error is generated from the smooth area. The next important issue is to estimate a large optical flow that is generated due to a fast motion. In this case, a small motion assumption, which is also a common assumption in optical flow estimation, is incorrect. An image pyramid structure may be used to handle a large motion, but optical flow estimation in a dense structure is difficult. The last issue is to detect occlusion areas and properly handle optical flows in the occlusion areas. When a motion is large, a large occlusion area may be generated.

To address this problem, a large motion is handled via a corresponding point search that may correspond to brightness changes in pixels by using a more complex similarity scale and that uses a Markov random field (MRF) modeling, which is frequently used in stereo matching or a nearest neighbor search. A PatchMatch method ([15] C. Barnes, E. Shechtman, A. Finkelstein, D. B. Goldman, PatchMatch: A Randomized Correspondence Algorithm for Structural Image Editing. ACM Transactions on Graphics, 2009) capable of performing an efficient nearest neighborhood search has been recently proposed, and thus PatchMatch-based optical flow estimation methods have been proposed. These methods may quickly perform an existing nearest neighbor search via efficient information propagation and are effective for large motions. However, because corresponding points are locally determined, an erroneous optical flow estimation may occur in an ambiguous area within an image or a smooth area. To address this problem, a PatchMatch Belief Propagation (PMBP) ([23] F. Besse et al., PMBP: PatchMatch Belief Propagation for Correspondence Field Estimation, IJCV 2013.) has been proposed, in which PatchMatch is applied to a belief propagation technique. The PMBP is faster than an existing optimization method and provides higher performance than the PatchMatch method.

However, PMBP-based optical flow estimation methods have several problems. First, large occlusion areas generated by large motions still fail to be effectively handled. The PMBP-based methods are effective in estimating an optical flow having a large motion, namely, a motion of a large magnitude, but fail to detect a large occlusion area inherent with a large motion and to handle the large occlusion area. Because the PMBP basically performs optimization via a belief propagation method, a wrong belief is propagated from an occlusion area, and thus the accuracy of optical flow estimation around the occlusion area may be reduced. Another problem of the PMBP-based optical flow estimation methods is that the number of calculations to be performed increases with an increase in the size of an image. In practice, as an image size increases, the number of pixels included in the image linearly increases, and a search area necessary for a corresponding point search also linearly increases. Thus, the number of calculations increases with the increases of the image size. However, the PMBP succeeds to merits of the PatchMatch method, and thus, even when the search area is larger, the number of necessary calculations seldom increases.

Figure 1:
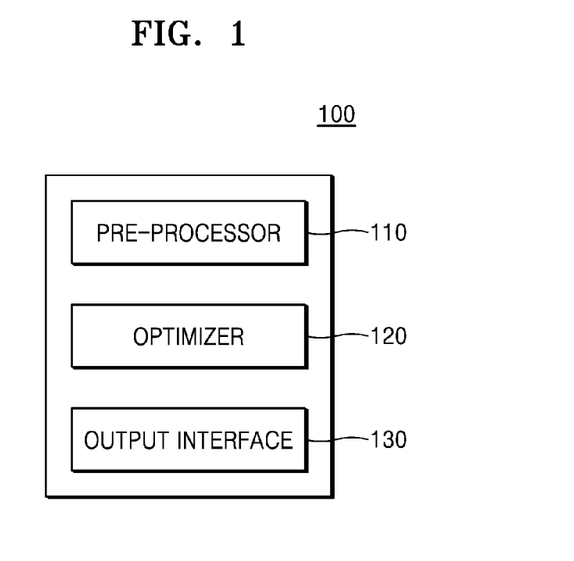
FIG. 1 is a block diagram of a structure of an apparatus for estimating image optical flow, according to an exemplary embodiment.

FIG. 1 is a block diagram of a structure of an apparatus 100 for estimating an image optical flow, according to an exemplary embodiment.

Referring to FIG. 1, the apparatus 100 may include a pre-processor 110, an optimizer 120, and an output interface 130.

The pre-processor 110 may receive temporally-consecutive first and second images and calculate change rates of brightness values of the received first and second images. The images may be received in a bitstream of image data.

The pre-processor 110 may reduce the number of pixels of each of the received first and second images and calculate rates of change of brightness values of the first and second images having the reduced number of pixels. Reduction of the number of pixels is performed by an image pyramid process. This will be described in greater detail later with reference to FIG. 6.

Figure 6:
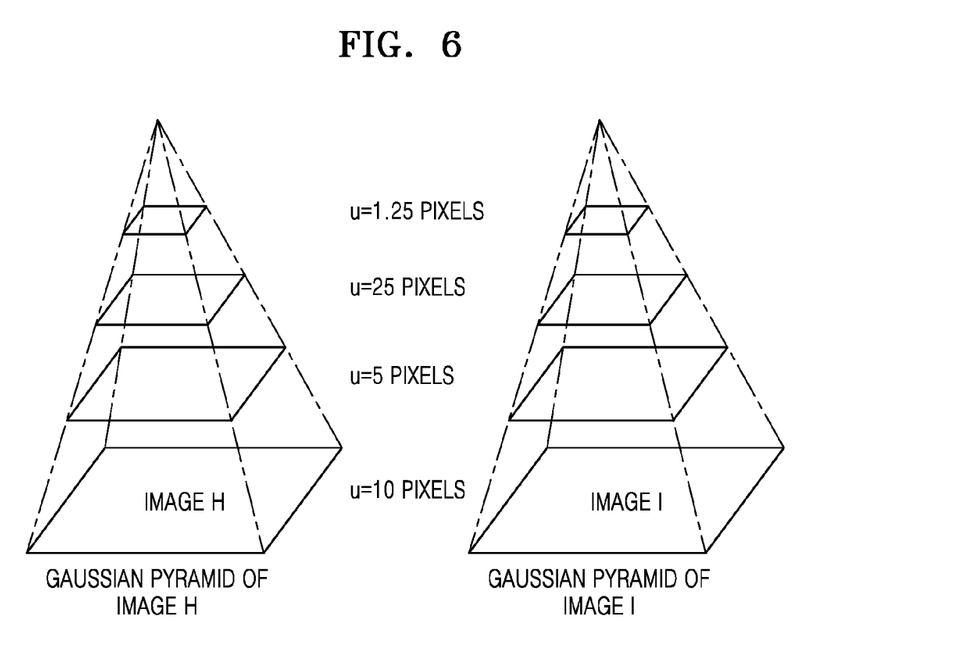

FIG. 6 is a schematic view for explaining a method of estimating an image optical flow, according to an exemplary embodiment. Referring to FIG. 6, a first image originally has 10 pixels, and a second image originally has 10 pixels. However, the pre-processor 110 sequentially reduces the pixels of each of the first and second images to 5 pixels, 2.5 pixels, and 1.25 pixels. An upper level of an obtained image pyramid is exponentially smaller than an original image. Thus, optimization may be first performed using a small image on an upper level of the image pyramid, and optimization may also be performed while propagating a result of the previous optimization to a lower level of the image pyramid, thereby increasing the speed because of the reduction of the number of pixels. A reason why the number of pixels included in an image is reduced is because an optical flow is estimated under an assumption that a motion of a pixel is small. This assumption is invalid in an image having a large number of pixels. Thus, the number of pixels included in an image is reduced to ensure that the assumption is correct during the optical flow estimation.

Referring back to FIG. 1, the pre-processor 110 may store the calculated rates of change and a graph structure.

The optimizer 120 may calculate a first optical flow estimation result value of a first pixel within the first image and a second optical flow estimation result value of a second pixel within the second image by using the calculated rates of change, and compare the first optical flow estimation result value of the first image with the second optical flow estimation result value of the second image.

The optimizer 120 may determine the first optical flow estimation result value to be an optical flow estimation result value of a neighboring pixel of the first pixel and may determine the second optical flow estimation result value to be an optical flow estimation result value of a neighboring pixel of the second pixel. This operation of the optimizer 120 may be defined as a result propagation operation. In the result propagation operation, it is assumed that neighboring pixels have the same optical flow. Accordingly, an optical flow estimation result of one pixel is propagated to a neighboring pixel, and a local search is performed on the vicinity of the neighboring pixel, thereby increasing the overall efficiency. When an original optical flow estimation result of the neighboring pixel has a high consistency-based reliability, the optimizer 120 determines that the original optical flow estimation result is reliable, and does not propagate the optical flow estimation result of the pixel. The optimizer 120 reduces the number of iterations a local search is performed, and does not perform an additional calculation with respect to pixels already having sufficiently-accurate results. Thus, the efficiency of estimating n image optical flow increases.

Figure 2:
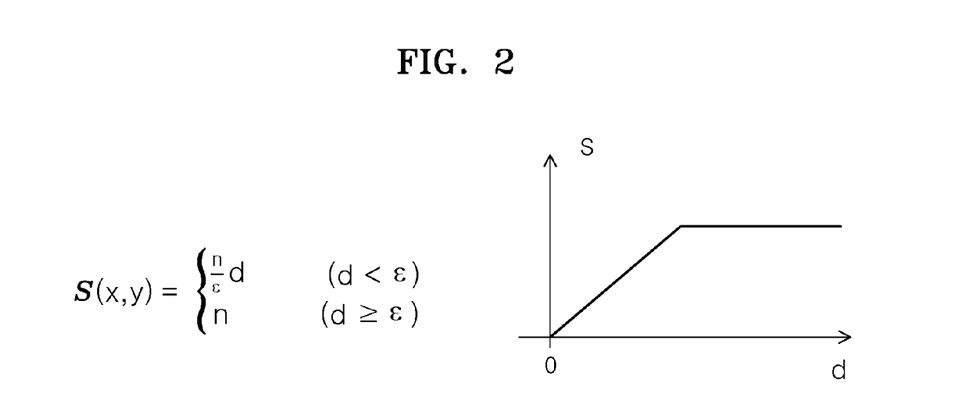
FIGS. 2-6 are diagrams illustrating a method of estimating image optical flow, according to an exemplary embodiment.

This will be described in greater detail later with reference to FIG. 2. A local search frequency (number of iterations) S is defined as Equation (1), which is shown in FIG. 2:

$$S(x, y) = \begin{cases} \frac{n}{\varepsilon}d & (d < \varepsilon) \\ n & (d \geq \varepsilon) \end{cases} \quad (1)$$

where, when the local search frequency S is less than 1, the local search frequency S is treated as the probability of applying a local search. In Equation (1), n and ε are positive numbers and d is equal to a result obtained from a consistency check. The graph shown in FIG. 2 represents the above equation.

Referring to FIG. 1, the optimizer 120 may calculate an energy using a belief propagation algorithm. The optimizer 120 may determine a consistency-based reliability of an optical flow estimation result value by using a result of the comparison. The optimizer 120 may determine the energy by using the consistency-based reliability. The optimizer 120 may calculate the energy by using an iteration number-based reliability. The energy may be calculated via an energy function of Equation (2) below:

$$E(x,y) = E_u(x,y) + E_s(x,y) + w(i)E_c(x,y) \quad (2)$$

where $E_u(x,y)$ indicates a difference value between images obtained using an optical flow result estimated as a data cost. In Equation (2), $E_s(x,y)$ indicates a difference value between optical flow results of consecutive images.

Figure 4:
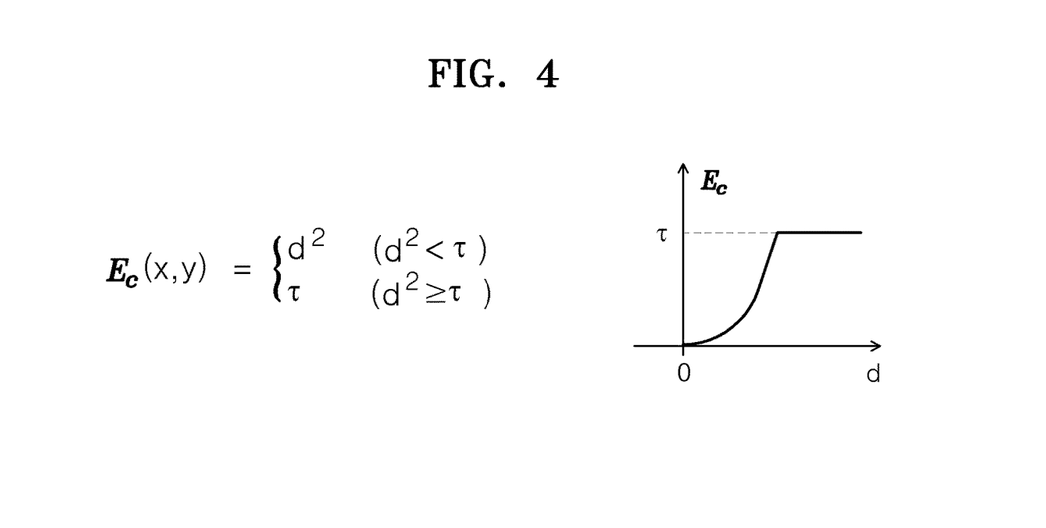
Figure 5:
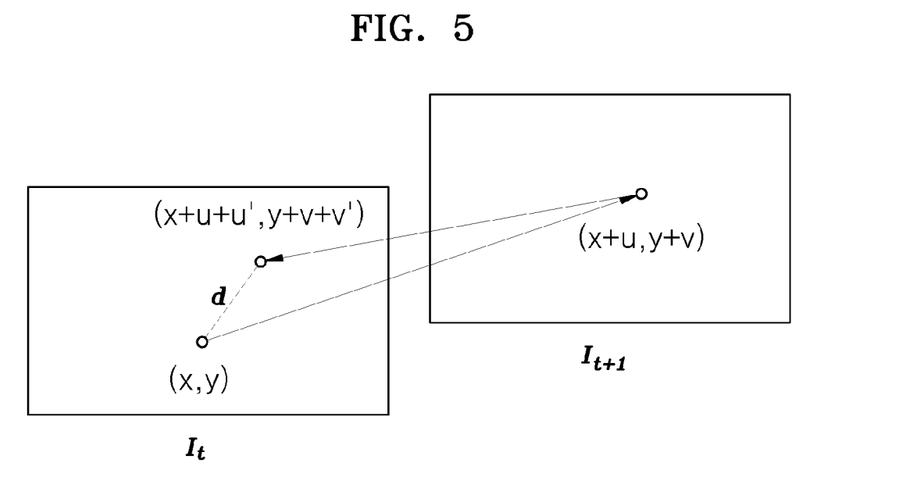

$E_c(x,y)$ will now be described with reference to FIG. 4. $E_c(x,y)$ is calculated using Equation (3) below:

$$E_c(x, y) = \begin{cases} d^2 & (d^2 < \tau) \\ \tau & (d^2 \geq \tau) \end{cases} \quad (3)$$

where τ indicates a constant, and d indicates a difference between coordinate values calculated in a consistency check. The consistency check will now be described with reference to FIG. 5.

Referring to FIG. 5, $I_t$ indicates a first image, and $I_{t+1}$ indicates a second image temporally located after the first image. A pixel at a coordinate (x,y) of the first image may be moved to a coordinate (x+u, y+v) of the second image according to an optical flow estimation result of the first image. Next, the coordinate (x+u, y+v) of the second image may be moved from the coordinate (x+u,y+v) of the second image to a coordinate (x+u+u', y+v+v') according to an optical flow estimation result of the second image. Thus, a difference between the coordinate (x,y) of the first image and the coordinate (x+u+u',y+v+v') indicating an estimated optical flow from the second image to the first image may be defined as d. In FIG. 5, u and v indicate estimated optical flow results, and u' and v' indicate optical flow estimated results of a moved coordinate. The difference d is expressed as in Equation (4):

$$d = \sqrt{(u+u')^2 + (v+v')^2} \quad (4)$$

Figure 3:
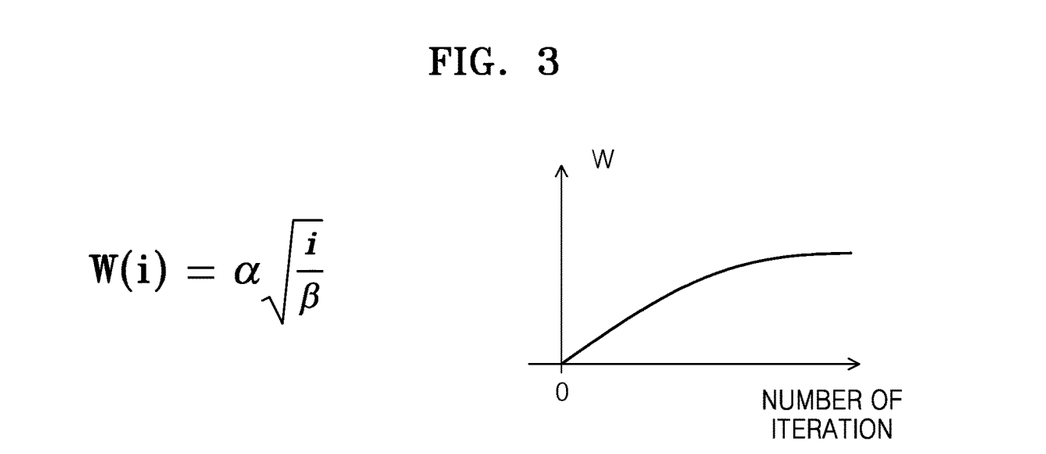

In Equation (2), w(i) indicates a weight for preventing occlusion to a local minimum. The weight w(i) will now be described with reference to FIG. 3. The weight w(i) is calculated using Equation (5) below: where i indicates the number of iterations of the optimization operation, and α and β indicate constants. PMBP is repeated a preset number of times, namely, i.

$$w(i) = \alpha \sqrt{\frac{i}{\beta}} \quad (5)$$

Referring to FIG. 1, the output interface 130 may output the optical flow estimation result value. The output interface 130 may correct the optical flow estimation result values of the first and second images by using a result of the comparison. In addition, because the energy include information of the result of the comparison, consistency-based reliability, and iteration number-based reliability, the output interface 130 may correct the optical flow estimation result values of the first image and the second image by using the energy. And then, the output interface 130 outputs the corrected optical flow estimation result values.

Figure 7:
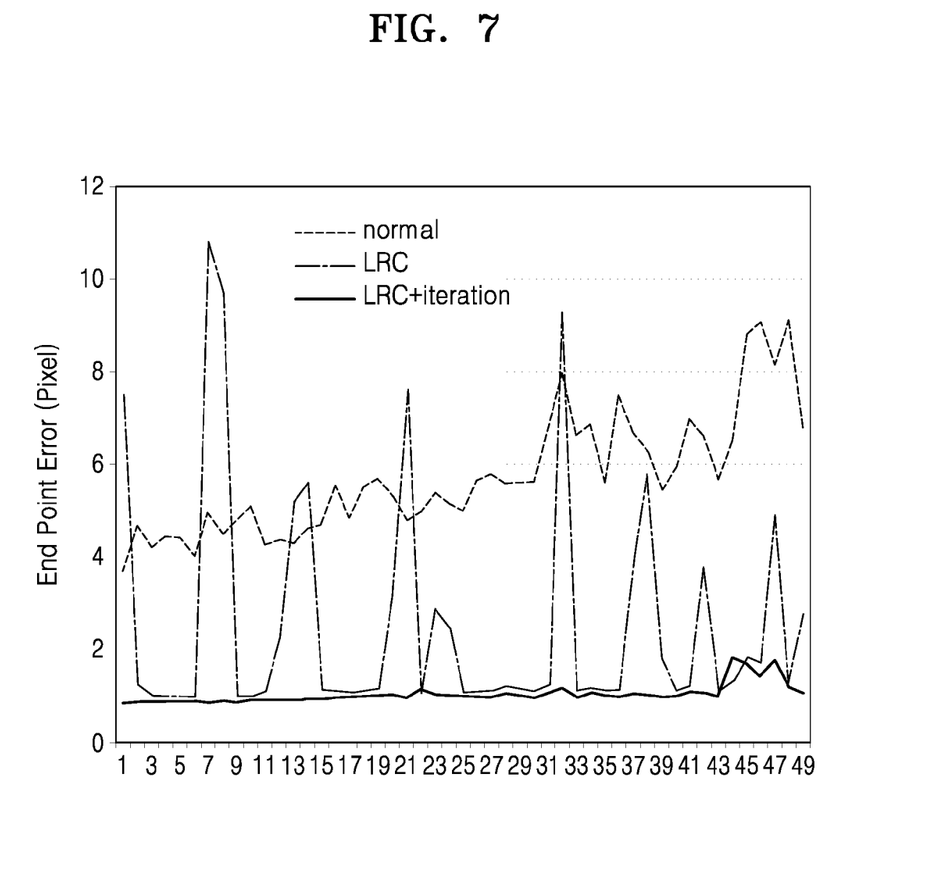
FIG. 7 is a diagram showing an effect of a method of estimating image optical flow, according to an exemplary embodiment

FIG. 7 is a graph showing an effect of a method of estimating an image optical flow, according to an exemplary embodiment. Referring to FIG. 7, the "normal" line indicates an output on which an optical flow has been estimated using only PMBP, the "longitudinal redundancy check (LRC)" line indicates an output on which an optical flow has been estimated using consistency-based reliability in addition to PMBP, and the "LRC+iteration" line indicates an output on which optical flow estimation has been performed using consistency-based reliability and iteration number-based reliability in addition to PMBP. When the outputs are compared with one another, the output on which an optical flow has been estimated using only PMBP has a high proportion of erroneous pixels, and the output on which an optical flow has been estimated using consistency-based reliability in addition to PMBP has a low proportion of erroneous pixels but several high proportions of high erroneous pixels are generated. The output on which an optical flow has been estimated using both consistency-based reliability and iteration number-based reliability in addition to PMBP shows a low erroneous rate. Accordingly, an output of which an optical flow has been estimated using both consistency-based reliability and iteration number-based reliability in addition to PMBP shows a lowest proportion of erroneous pixels.

Figure 8:
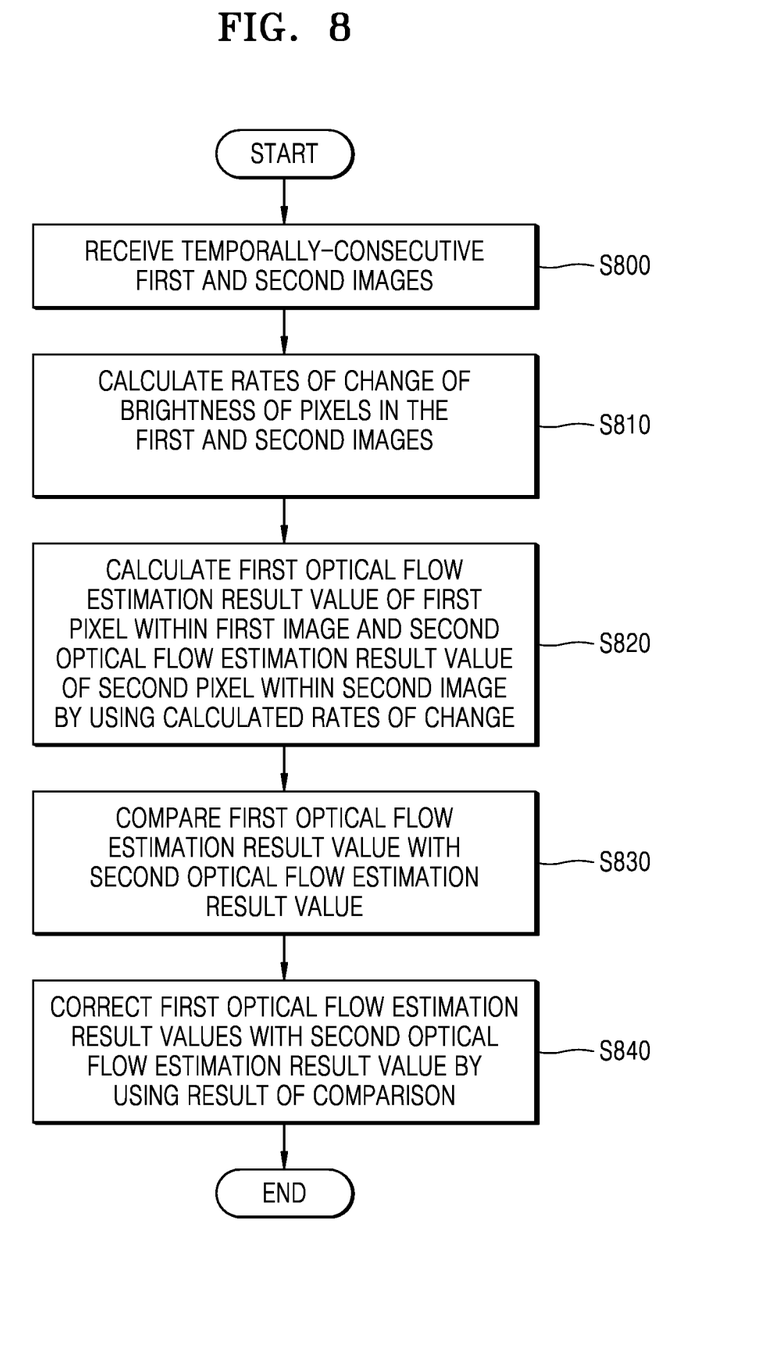
FIG. 8 is a flowchart of estimating image optical flow, according to an exemplary embodiment.

FIG. 8 is a flowchart of a method of estimating an image optical flow, according to an exemplary embodiment.

In operation S800, temporally-consecutive first and second images may be received.

In operation S810, rates of change of brightness values of the temporally-consecutive first and second images may be calculated.

In operation S820, a first optical flow estimation result value of a first pixel within the first image and a second optical flow estimation result value of a second pixel within the second image may be calculated using the calculated rates of change.

In operation S830, the first optical flow estimation result value of the first image may be compared with the second optical flow estimation result value of the second image.

In operation S840, the first and the second optical flow estimation result values of the first and second images may be corrected using a result of the comparison.

The apparatuses described herein may comprise a processor, a memory for storing program data and executing the program data, a permanent storage unit, such as a disk drive, a communications port for handling communications with external devices, and user interface devices, including a touch panel, keys, buttons, etc. When software modules or algorithms are involved, these software modules may be stored as program instructions or computer readable codes executable on a processor on a computer-readable medium. Examples of the computer readable recording medium include magnetic storage media (e.g., read-only memory (ROM), random-access memory (RAM), floppy disks, hard disks, etc.), and optical recording media (e.g., CD-ROMs, or Digital Versatile Discs (DVDs)). The computer readable recording medium can also be distributed over network coupled computer systems so that the computer readable code is stored and executed in a distributive manner. This media can be read by the computer, stored in the memory, and executed by the processor.

Exemplary embodiments of the present disclosure may be described in terms of functional block components and various processing steps. Such functional blocks may be realized by any number of hardware and/or software components configured to perform the specified functions. For example, exemplary embodiments may employ various integrated circuit (IC) components, e.g., memory elements, processing elements, logic elements, look-up tables, and the like, which may carry out a variety of functions under the control of one or more microprocessors or other control devices. Similarly, where the elements are implemented using software programming or software elements, the embodiments described herein may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the exemplary embodiments described herein could employ any number of conventional techniques for electronics configuration, signal processing and/or control, data processing and the like. The words "mechanism," "element," "means," and "configuration" are used broadly and are not limited to mechanical or physical embodiments, but can include software routines in conjunction with processors, etc.

The particular implementations shown and described herein are illustrative examples and are not intended to otherwise limit the scope of the present disclosure in any way. For brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical apparatus.

The use of the terms "a" and "an" and "the" and similar referents in the context of describing the present disclosure (especially in the context of the following claims) are to be construed to cover both the singular and the plural expressions. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. The present disclosure is not limited to the described order of the steps. The use of any and all examples, or exemplary language (e.g., "such as") provided herein, is intended merely to better illuminate the inventive concept and does not pose a limitation on the scope of the inventive concept unless otherwise claimed. Numerous modifications and adaptations will be readily apparent to one of ordinary skill in the art without departing from the spirit and scope.

The exemplary embodiments should be considered in descriptive sense only and not for purposes of limitation. Descriptions of features or aspects within each embodiment should typically be considered as available for other similar features or aspects in other embodiments.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. A method of estimating image optical flow, the method comprising:
   receiving a first image and a second image, the first image and the second image being temporally consecutive with each other;
   calculating rates of change of brightness values of pixels in the first image and the second image;
   calculating a first optical flow estimation result value of a first pixel within the first image and a second optical flow estimation result value of a second pixel within the second image by using the calculated rates of change;
   comparing the first optical flow estimation result value with the second optical flow estimation result value; and
   correcting the first optical flow estimation result value of the first image and the second optical flow estimation result value of the second image by using a result of the comparison.

2. The method of claim 1, further comprising:
   down-scaling pixels included in each of the first image and the second image, wherein the calculating of the rates of change comprises calculating rates of changes of brightness values of the down-scaled first image and the down-scaled second image.

3. The method of claim 1, further comprising:
   outputting a first corrected optical flow estimation result value of the first image and a second corrected optical flow estimation result value of the second image.

4. The method of claim 1, further comprising:
   storing the calculated rates of change.

5. The method of claim 1, further comprising:
   determining the first optical flow estimation result value to be a first optical flow estimation result value of a neighboring pixel of the first pixel and determining the second optical flow estimation result value to be a second optical flow estimation result value of a neighboring pixel of the second pixel.

6. The method of claim 1, further comprising:
   calculating an energy by using a belief propagation algorithm, wherein the energy indicates a reliability of the first flow estimation result value and the second flow estimation result value.

7. The method of claim 6, wherein the comparing comprises determining a consistency-based reliability of the first optical flow estimation result value and the second optical flow estimation result value by using the result of the comparison.

8. The method of claim 7, wherein the calculating of the energy comprises calculating the energy by using the consistency-based reliability.

9. The method of claim 8, wherein the calculating the energy comprises calculating the energy by using an iteration number-based reliability.

10. An apparatus for estimating image optical flow, the apparatus comprising:
    a pre-processor configured to receive a first image and a second image and calculate rates of change of brightness values of pixels in the first image and the second image, the first image and the second image being temporally consecutive with each other;
    an optimizer configured to calculate a first optical flow estimation result value of a first pixel within the first image and a second optical flow estimation result value of a second pixel within the second image by using the calculated rates of change, and compare the first optical flow estimation result value with the second optical flow estimation result value; and
    an output interface configured to correct the first optical flow estimation result value of the first image and the second optical flow estimation result value of the second image by using a result of the comparison.

11. The apparatus of claim 10, wherein the pre-processor is further configured to down scale pixels of each of the first image and the second image and calculate rates of change of brightness values of the downscaled first image and the downscaled second image.

12. The apparatus of claim 10, wherein the output interface is further configured to output a first corrected optical flow estimation result value of the first image and a second corrected optical flow estimation result value of the second image.

13. The apparatus of claim 10, wherein the pre-processor is further configured to store the calculated rates of change.

14. The apparatus of claim 10, wherein the optimizer is further configured to determine the first optical flow estimation result value to be a first optical flow estimation result value of a neighboring pixel of the first pixel and to determine the second optical flow estimation result value to be a second optical flow estimation result value of a neighboring pixel of the second pixel.

15. The apparatus of claim 10, wherein the optimizer is further configured to calculate an energy by using a belief propagation algorithm, and the energy indicates a reliability of the first flow estimation result value and the second flow estimation result value.

16. The apparatus of claim 15, wherein the optimizer is further configured to determine a consistency-based reliability of the first optical flow estimation result value and the second optical flow estimation result value by using the result of the comparison.

17. The apparatus of claim 16, wherein the optimizer is further configured to calculate the energy by using the consistency-based reliability.

18. The apparatus of claim 17, wherein the optimizer is further configured to calculate the energy by using an iteration number-based reliability.

19. A non-transitory computer-readable recording medium having recorded thereon a computer program, which, when executed by a computer, performs the method of claim 1.

20. A method of estimating image optical flow, the method comprising:
    receiving a first image and a second image, the first image and the second image being temporally consecutive with each other;
    calculating rates of change of brightness values of pixels of the first image and the second image;
    calculating a first optical flow estimation result value of a first pixel within the first image and a second optical flow estimation result value of a second pixel within the second image by using the calculated rates of change;
    calculating an energy by using an iteration number-based reliability and a consistency-based reliability of the first optical flow estimation result value and the second optical flow estimation result value, wherein the energy indicates a reliability of the first flow estimation result value and the second flow estimation result value; and correcting the first optical flow estimation result value and the second optical flow estimation result value according to the energy.

21. The method of claim 20, wherein the consistency-based reliability is calculated according to a comparison result of comparing the first optical flow estimation result value with the second optical flow estimation result value.

* * * * *